US006612826B1

(12) United States Patent
Bauer et al.

(10) Patent No.: US 6,612,826 B1
(45) Date of Patent: Sep. 2, 2003

(54) SYSTEM FOR CONSOLIDATING POWDERS

(75) Inventors: David P. Bauer, Xenia, OH (US); Duane C. Newman, London, OH (US)

(73) Assignee: IAP Research, Inc., Dayton, OH (US)

(*) Notice: Subject to any disclaimer, the term of this patent is extended or adjusted under 35 U.S.C. 154(b) by 851 days.

(21) Appl. No.: 08/950,965

(22) Filed: Oct. 15, 1997

(51) Int. Cl.[7] .......................... B29C 43/58; B30B 11/02

(52) U.S. Cl. .................... 425/135; 425/167; 425/174.6; 425/355

(58) Field of Search ................................ 425/352, 167, 425/135, 174.6, 149, 355, 408

(56) References Cited

U.S. PATENT DOCUMENTS

| | | | | | |
|---|---|---|---|---|---|
| 2,562,876 | A | * | 8/1951 | Baeza | 425/149 |
| 3,069,261 | A | | 12/1962 | Kilby et al. | |
| 3,143,413 | A | | 8/1964 | Krapf | |
| 3,250,892 | A | | 5/1966 | Inoue | |
| 3,508,029 | A | | 4/1970 | Inoue | |
| 3,873,805 | A | * | 3/1975 | Inoue | 219/149 |
| 3,883,278 | A | * | 5/1975 | Hass | 425/135 |
| 4,062,914 | A | * | 12/1977 | Hinzpeter | 425/149 |
| 4,929,415 | A | | 5/1990 | Okazaki | 419/52 |
| 4,989,153 | A | * | 1/1991 | Bonvini | 219/149 |
| 5,084,088 | A | | 1/1992 | Okazaki | 75/10.1 |
| 5,394,721 | A | * | 3/1995 | Iwayama et al. | 72/46 |
| 5,405,574 | A | | 4/1995 | Chelluri et al. | 419/47 |
| 5,529,746 | A | | 6/1996 | Knoss et al. | 419/38 |
| 5,547,360 | A | * | 8/1996 | Yokoyama | 425/149 |
| 5,580,586 | A | * | 12/1996 | Yokoyama | 425/150 |
| 5,611,139 | A | | 3/1997 | Chelluri et al. | 29/744 |
| 5,611,230 | A | | 3/1997 | Chelluri et al. | 72/56 |
| 5,689,797 | A | | 11/1997 | Chelluri et al. | 419/38 |

FOREIGN PATENT DOCUMENTS

| | | |
|---|---|---|
| JP | 08041507 | 2/1996 |

OTHER PUBLICATIONS

International Search Report completed Feb. 5, 1999 for International Application No. PCT/US98/21725.

"High–Energy, High–Rate Materials Processing", H. L. Marcus et al., University of Texas at Austin, Journal of Metals, Dec. 1987.

* cited by examiner

*Primary Examiner*—Robert Davis
*Assistant Examiner*—Thu Khanh T. Nguyen
(74) *Attorney, Agent, or Firm*—Jacox, Meckstroth & Jenkins

(57) ABSTRACT

This invention relates to a system and method for consolidating particulate material, such as particulate material, in order to achieve at least ninety-five percent (95%) or even ninety-eight percent (98%) of its maximum theoretical density using a relatively long duration, relatively low current density current flow through the material. In one embodiment, the consolidation system includes a feedback control for monitoring various characteristics associated with the particulate material being consolidated and providing feedback information to a power supply which controls the amount of current supplied to the particulate material in order to achieve the desired density. The consolidation system and method is characterized in that the duration of the current is greater than 0.1 second, but typically less than about 1 second, while the current is less than about 10KA/cm$^2$.

12 Claims, 6 Drawing Sheets

SYSTEM FOR CONSOLIDATING POWDERS

BACKGROUND OF THE INVENTION

1. Field of the Invention

This invention relates to a method and apparatus for consolidating particulate material, such as powders, and more particularly, to a system and method for consolidating particulate material by applying relatively long duration current flow at relatively low current densities to the particulate material in order to achieve densities in excess of ninety percent (90%) of the theoretical maximum density for the particulate material.

2. Description of Related Art

The consolidation of particulate material under relatively high compaction pressure using molds and dies to manufacture parts has become a frequently used industrial process. One of the major limitations of the powder material compaction process is that, with most materials, less than full densification is achieved during the compaction process. Typically, powder material consolidation results in less than ninety-three percent (93%) of its full theoretical density for many powders and for difficult to compact materials (such as stainless steel) less than eighty-five percent (85%) of theoretical density is achieved. Less than full density, results in degraded material properties, such as strength, stiffness, magnetisity and the like. High density is required to enable particulate material consolidation to make higher performance parts, such as gears, for example, for use in automobiles because high strength is often required.

U.S. Pat. Nos. 4,929,415; 4,975,412; 5,084,088; 5,529,746; 5,380,473 are examples of consolidation techniques of the type used in the past. For example, Okazaki discloses a method for sintering and forming powder. This method uses a high voltage of 3 KV or more which is applied to a mold filled with the powder using an electrode which maintains a high current of 50 $KAcm^{-2}$ or greater for a period of time from 10 to 500 microseconds.

Similarly, U.S. Pat. No. 4,975,412 also discloses a method of processing superconducting materials which utilizes, again, a high voltage and current density to provide sharp bonding between or among the particulate material.

Still another example is U.S. Pat. No. 5,529,746 issued to Knoss which discloses processing the powders using one to three electric current pulses from $5\times10^{-5}$ to $5\times10^{-2}$ second duration and high electric power applied to the punches of the press.

Thus, the typical technique for consolidating the particulate material is to use a relatively high current pulse of fairly short duration to cause consolidation of the powder. A problem with this approach has been, that under these conditions electrical arcing may occur at the interface between the powder and the current-conducting punches. This arcing will severely limit the useful life of the punches and, therefore, must be overcome in order to make this technique commercially viable.

Still another problem of the prior art is that the walls of the molds or dies used during the consolidation process required an insulator, such as ceramic. One significant problem with this approach is that the ceramic used for insulating the walls were not suitable for generating parts having shapes which require intricate details because when the intricate details are machined into the ceramic insulators and the insulators in the die, the ceramic would sometimes crack or chip upon use during the consolidation process.

Another problem with prior art techniques is that they did not permit tailoring of the power input to the powder mass to allow controlled power input. This resulted in inconsistent densification of parts manufactured using the consolidation process.

What is needed, therefore, is a system and method for consolidating powders which will avoid the problems encountered by the techniques used in the past.

SUMMARY OF THE INVENTION

It is, therefore, a primary object to provide a system and method for using relatively long duration, relatively low current density, proximately constant voltage electrical current flow through the particulate material during the consolidation process.

Another object of the invention is to provide a system and method for consolidating particulate material using relatively long duration, relatively low current density in a manner that will permit achievement of ninety-eight percent (98%) or greater of the material's theoretical density, even when used with materials which traditionally have been very difficult to consolidate, such as stainless steel, Sendust, 4405 and the like.

Another object of the invention is to provide a system and method for avoiding undesired arcing at the interface between the punch and particulate material, thereby improving the useful life of the punches.

Another object of the invention is to provide a consolidation system and method which may utilize either a DC voltage source or a near constant AC voltage source while the current density is kept below about 10 $KA/cm^2$ and the duration of the current discharge maintained longer than 0.1 second, depending on the powder being consolidated.

Still another object of the invention is to provide a consolidation system and method which realizes only modest temperature rises in the powder during the consolidation process.

Yet another object of the invention is to provide a consolidation system and method which utilizes active feedback control of the power input during the consolidation process, thereby permitting tailoring of the power input to the particulate material being consolidated.

Still another object of the invention is to provide an active feedback control for controlling the power input which facilitates realizing controlled densification.

Yet another object of the invention is to provide a system and method for providing a non-ceramic insulator which facilitates developing intricate molds or dies which have not been realized in the past so that intricate details, such as gear teeth on an outer periphery of a gear may be easily manufactured.

In one aspect, this invention comprises a powder consolidation system comprising a powder die for receiving a powder to be consolidated, a first punch and a second punch which cooperate with the powder die to compress the powder, a power source coupled to the first and second punches to energize the powder to a predetermined energy level when the powder is being consolidated, and a feedback control coupled to the punches and the power source for monitoring a characteristic of the powder when it is being consolidated and generating a feedback signal in response thereto, the power source adjusting the predetermined energy level in response to the feedback signal while the powder is being consolidated such that the powder achieves at least ninety-eight percent (98%) of its maximum theoretical density.

In another aspect, this invention comprises a method for consolidating a powder comprising the steps of situating a powder in a powder die, compressing the powder in the powder die using a first punch and a second punch, energizing the powder to a predetermined energy level during the compressing step, monitoring a characteristic of the powder during the compressing step and generating a feedback signal in response thereto, and adjusting the predetermined energy level in response to the feedback signal during the compressing step.

Other objects and advantages of the invention will be apparent from the following description, the accompanying drawings, and the appended claims.

BRIEF DESCRIPTION OF ACCOMPANYING DRAWINGS

DETAILED DESCRIPTION OF THE PREFERRED EMBODIMENT

Figure 1:
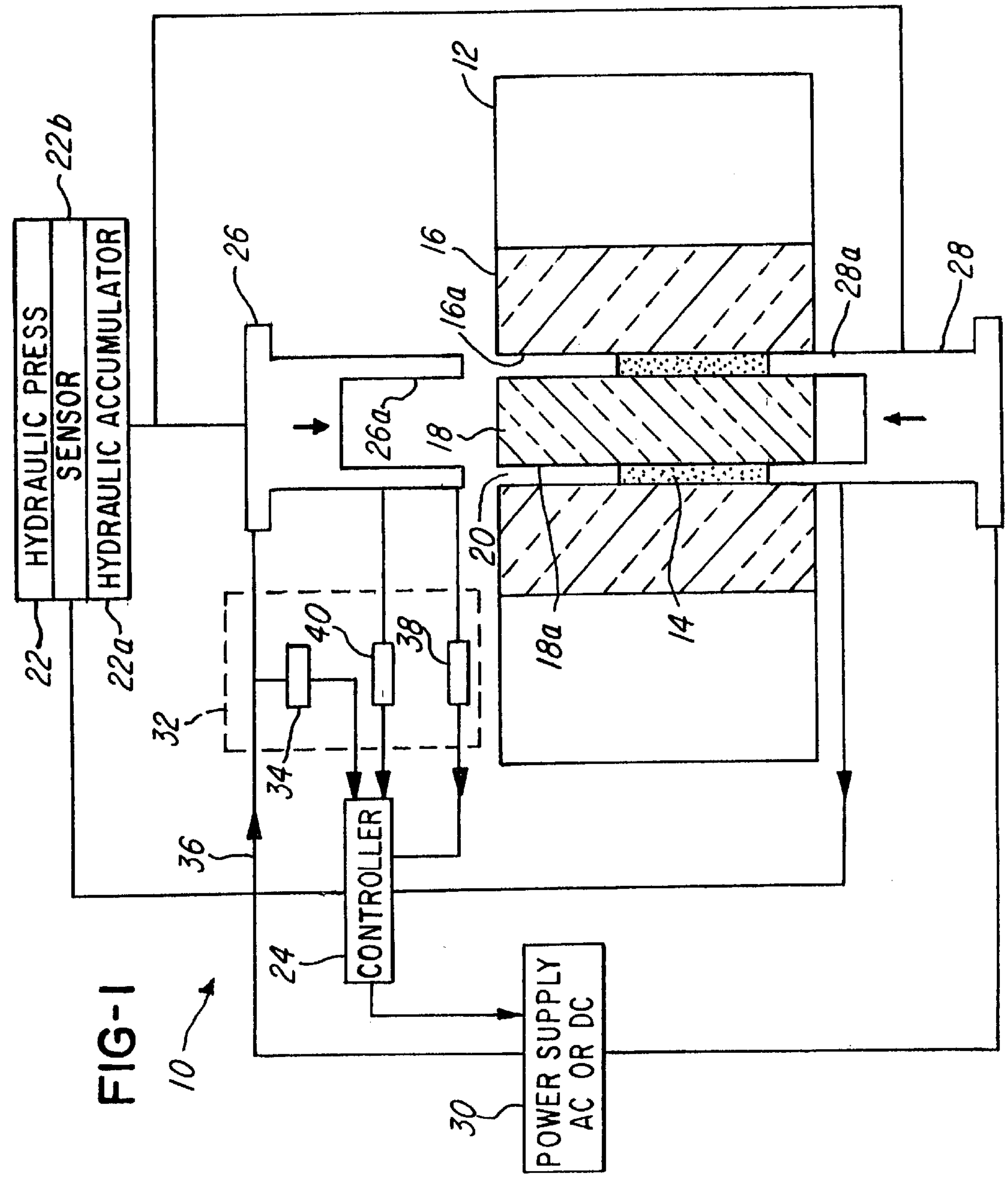
FIG. 1 is a sectional-schematic view of a system according to one embodiment of the invention, showing at least one punch in an open position.

Referring now to FIG. 1, a particulate material consolidation system 10 is shown comprising a die 12 for receiving a particulate material 14, such as a powder. In the embodiment being described, the die 12 comprises a ceramic liner 16 and ceramic rod 18 which cooperate to define an aperture 20 for receiving the particulate material 14. For ease of illustration, the die 12 and ceramic components 16 and 18 are shown to define a tubular aperture 20 for receiving particulate material which is consolidated to provide a tubular-shaped part after the consolidation process is complete in the manner described below.

Figure 5:
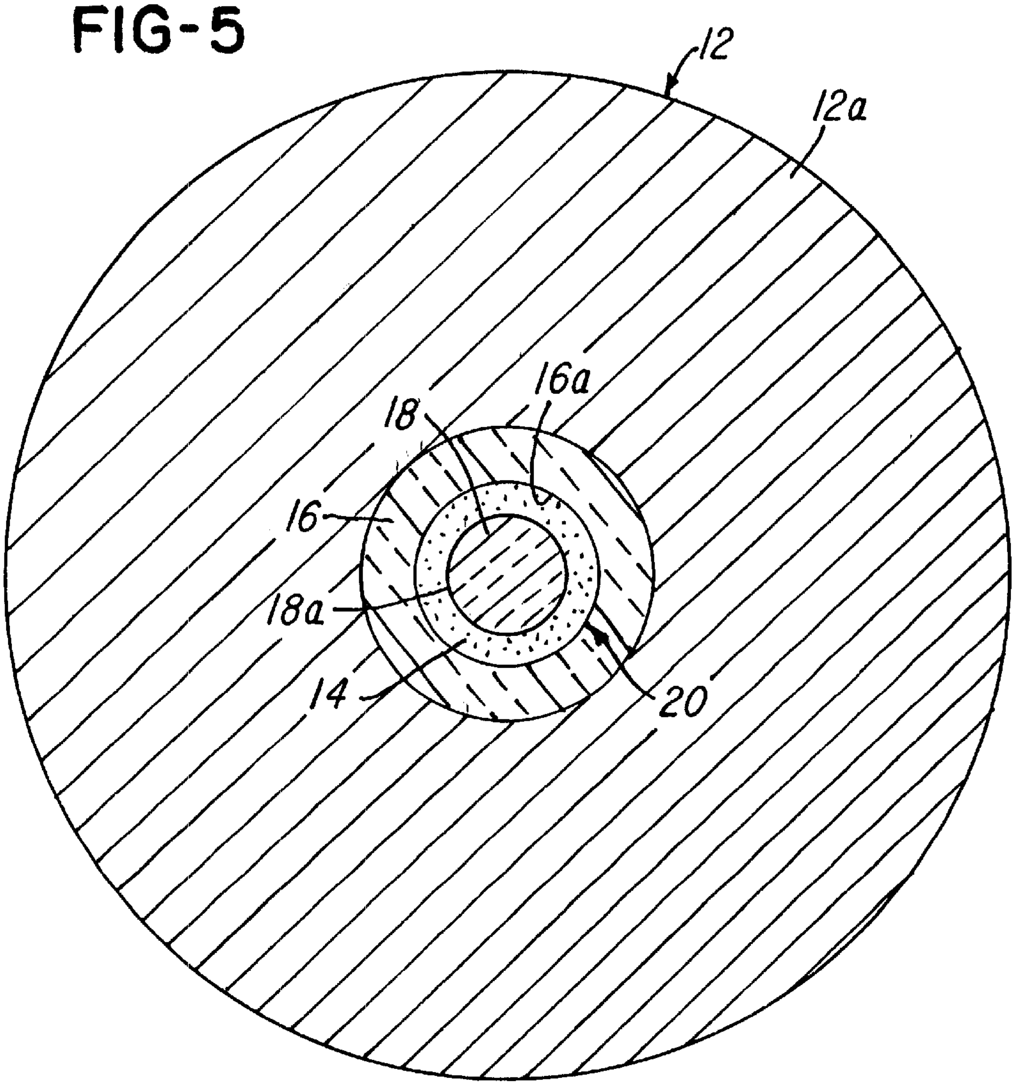
FIG. 5 is a sectional, plan view illustrating various components of the die arrangement illustrated in FIG. 1.

As illustrated in FIG. 5, the die 12 comprises a steel die member 12*a* comprising the insulative liner 16 which, in the embodiment shown in FIG. 1, is a ceramic. liner. Notice in FIG. 1 that an inner surface 16*a* of insulator 16 cooperates with an outer surface 18*a* of insulator 18 to define the aperture 20 which receives the particulate material 14. It should be appreciated that while the embodiment shown and described herein illustrates the consolidation of a tubular part, the features of this invention may be used to consolidate many different types of parts having different shapes and dimensions. For example, it is envisioned that this consolidation system and method may be utilized to manufacture various industrial and automotive parts, such as gear members, compressor members, flanges, clamps, magnets, as well as other parts as may be desired.

The consolidation system 10 comprises a hydraulic press 22 which is coupled to and under the operation of a controller 24, but it could be a mechanical, electrical or other suitable press as desired. The hydraulic press 22 comprises a hydraulic accumulator 22*a* for facilitating providing a substantially constant or linear hydraulic pressure during the consolidation process in coordination with electrical power flow. The press 22 comprises a sensor 22*b* coupled to controller 24 for sensing a hydraulic pressure. The press 22 comprises a plurality of punches 26 and 28 which cooperate such that their engaging ends 26*a* and 28*a* are received in aperture 20 and apply a consolidating or compressive force against particulate material 14 to produce the part (not shown).

In the embodiment being described, the controller 24 is a programmable logic controller ("PLC") program to function in a manner described later herein. Controller 24 is also coupled to a power source 30 which, in turn, is coupled to punches 26 and 28 and which provide a predetermined energy level, under control of controller 24, to said particulate material 14 in the manner described later herein.

The particulate material consolidation system 10 further comprises feedback control 32 or feedback control means for monitoring a characteristic of the particulate material 14 during the consolidation process and for generating feedback information, such as a feedback signal, in response thereto. In the embodiment being described, the feedback control 32 comprises a plurality of sensors, including a current sensor 34 which senses a current on line 36 between punch 26 and power supply 30. The feedback control 32 further comprises a voltage sensor 38 situated between control 24 and punch 26 for sensing a voltage drop across particulate material 14.

The feedback control 32 further comprises a punch position sensor 40 coupled to controller 24 which senses a position of the punch 26 relative to punch 28 and provides position information regarding when the punches 26 and 28 are in an open position (illustrated in FIG. 1) or a closed position (illustrated in FIG. 2), as well as all positions in between.

Figure 2:
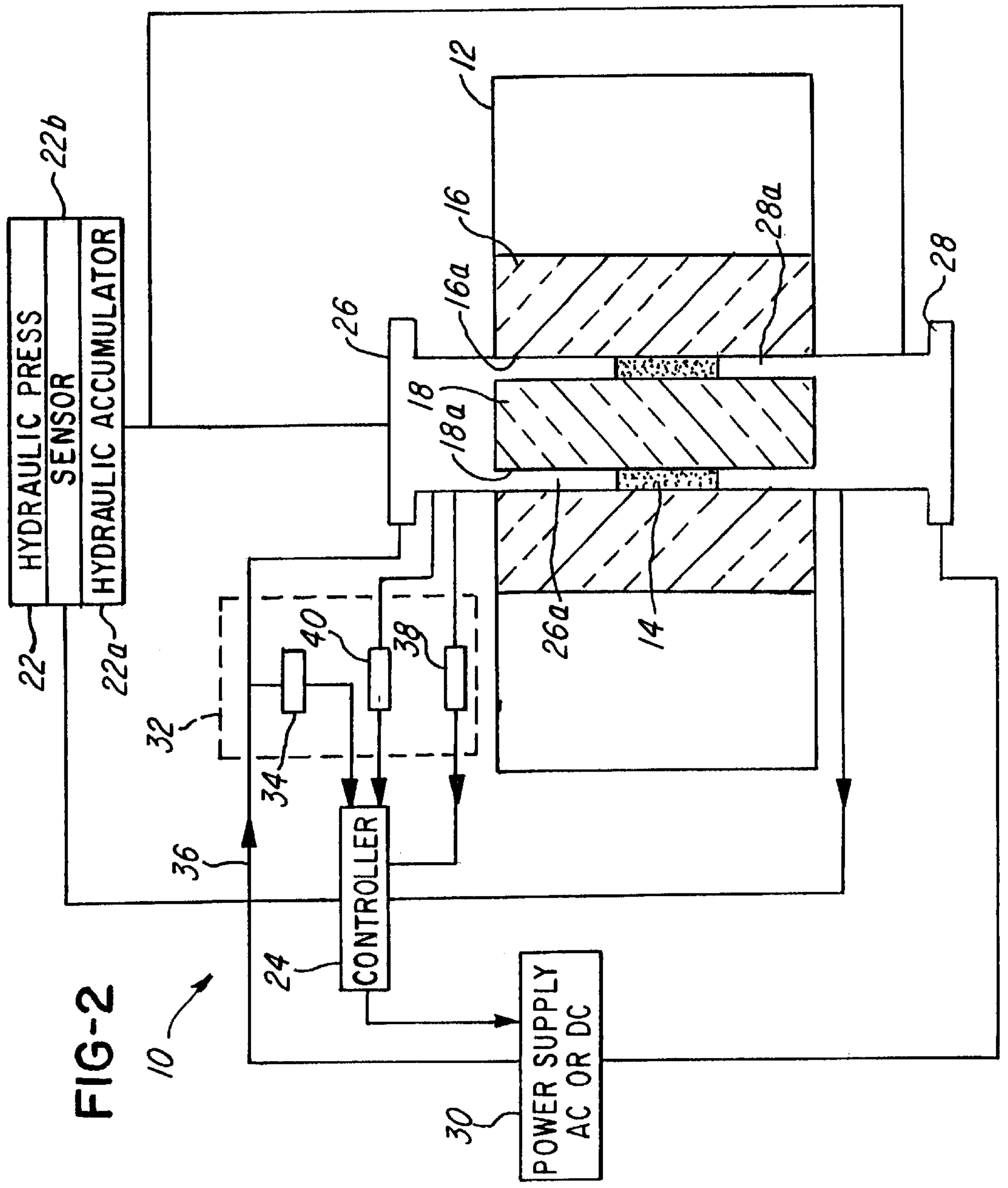
FIG. 2 is a view of the embodiment shown in FIG. 1, showing the punches in a generally closed position.

In the embodiment being illustrated in FIG. 1, it should be appreciated that it may be desired to first actuate punch 28 into aperture 20 which seals or closes an end of the aperture 20 such that it can receive particulate material 14 before punch 26 is actuated into the closed position illustrated in FIG. 2.

In the embodiment being described, feedback control 32 utilizes current sensor 34 to sense the current passing between punches 26 and 28. Feedback control 32 also generates a punch position signal using punch sensor, 40 and a voltage signal using voltage sensor 38. This sensed information is fed back to controller 24 which, in turn, is coupled to power supply 30 and which controls the amount of power supplied to punches 26 and 28 while the particulate material 14 is being consolidated. It has been found empirically that controlling the power supply has facilitated accommodating or tailoring the power supply 30 to the particular characteristics of the particulate material 14 being consolidated. The feedback control 32 also permits controlled power input which is coordinated with the actuation of punches 26 and 28 to achieve a particulate material density which is more uniform than techniques used in the past and which facilitates achieving at least ninety-five percent (95%) or even ninety-eight percent (98%) or greater of the maximum theoretical density for the particulate material 14 being consolidated.

The close-looped control system facilitates providing uniform part-to-part power delivery. In this regard, feedback control 32 uses sensor 40 to sense a punch position in die 12 so that when punches 26 and 28 are in die 12, the controller 24 causes power source 30 to provide an initial predetermined energy level to punches 26 and 28.

Controller 24 utilizes sensor 38 to measure a voltage across the particulate material 14 and current sensor 34 of feedback control 32 to provide a current measurement for the particulate material 14.

Controller 24 continuously computes the energy supplied to the particulate material 14 during the consolidation process. When a predetermined energy level for particulate material is achieved (such as 150 kJ/kg for Fe), then controller 24 turns power supply 30 off and energizes press 22 to drive punches 26 and 28 to an open position (FIG. 1) where the consolidated part may be removed from die 12.

It is envisioned that the PLC controller 24 may be programmed to cause the voltage and current supplied by power source 30 to vary. For example, controller 24 may use position sensor 40 to automatically initiate current flow, at the low levels described herein, just as punches 26 and 28 begin compressing or consolidating the particulate material 14. Thereafter, controller 24 may cause power supply 30 to ramp up or increase voltage and current as pressure or particulate material 14 increases during advance of the punches 26 and 28.

This power supply 30 ramp-up will offset the natural drop in resistance of the particulate material 14 and the drop in power delivered to the particulate material 14 when using a simple constant voltage course. Once again, measurement of the voltage drop across the particulate material 14 and the current through the particulate material 14 provides means for monitoring the power and energy delivered to the powder, so that the control system will cause a reliable-repeatable level of powder heating/consolidation.

It should also be appreciated that the feedback control 32 may control pressure supplied by the punches 26 and 28 or the punch 26 and 28 position to achieve the desired consolidation pressure throughout the electrical discharge.

A unique feature of the invention described herein is that it uses relatively long duration energization with low current densities which provides approximately constant voltage electrical current flow through the particulate material 14 as it is being consolidated. In the embodiment being described, the predetermined energy level comprises a duration of typically less than about one second and usually greater than or equal to about 0.1 seconds. Moreover, the power supply 30 provides a current density of less than about ten $KA/cm^2$ during the relatively long energizing period.

In the embodiment being described, the punches 26 and 28 comprise a punch resistivity of less than about $25\times10^{-8}$ Ohm-meter.

A method of operation of the particulate material consolidation system 10 shown in FIG. 1 will now be described relative to FIG. 6 where the procedure begins at block 42 by loading the particulate material 14 into aperture 20. At block 44, controller 24 energizes hydraulic press 22 to actuate punches 26 and 28 into the closed position (illustrated in FIG. 2) to consolidate or compress particulate material 14. During the consolidation process, controller 24 energizes power supply 30 to provide current flow (block 46 in FIG. 6) to punches 26 and 28 which, in turn, energizes the compressed particulate material 24. During this consolidation process, feedback control 32 monitors the current, voltage and punch position using sensors 34, 38 and 40, respectively, to provide feedback information to controller 24 (block 48 in FIG. 6) which, in turn, may adjust power supply 30 to alter or adjust the current supplied to punches 26 and 28. Typically, adjustment is required to compensate for powder fill variations and temperature variations.

During consolidation, hydraulic accumulator 22*a* may apply additional pressure to stabilize or provide a substantially linear pressure to the particulate material 14.

Figure 6:
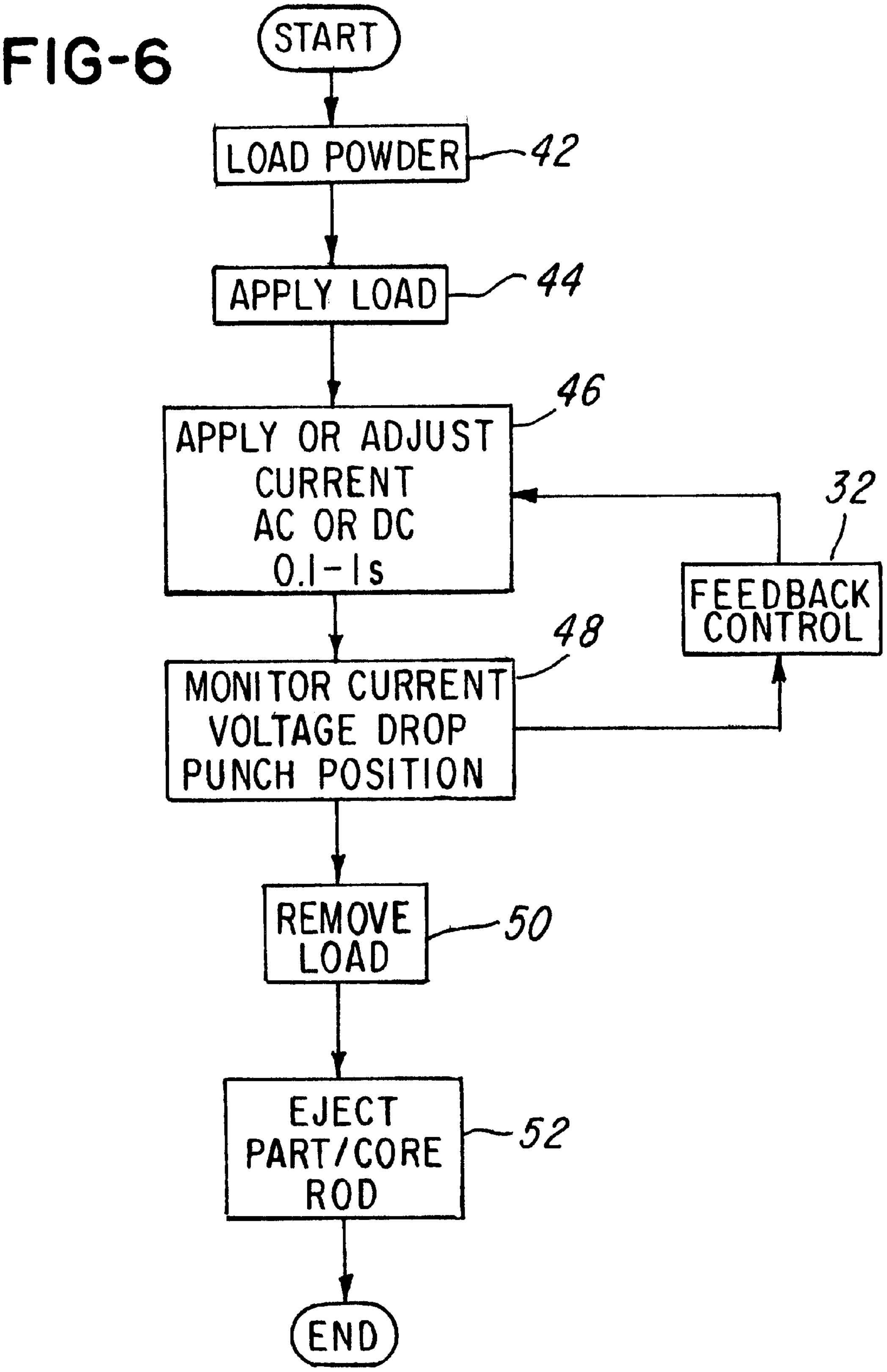
FIG. 6 is a schematic view of a process or procedure according to an embodiment of the invention.

Once the consolidation process is complete, controller 24 energizes hydraulic press 22 to move punches 26 and 28 to the open position (illustrated in FIG. 1 and shown at block 50 in FIG. 6) such that the consolidated part (not shown) may be ejected (block 52 in FIG. 6). Thereafter, the routine is complete, whereupon the procedure would proceed back to block 42 in order to produce another part.

Advantageously, this system and method provide means for densifying the particulate material to in excess of ninety-five percent (95%) or even ninety-eight percent (98%) of its theoretical maximum density using relatively low current density for relatively long periods. A plurality of tests were conducted and the following results are summarized in Tables I–III described later herein were realized. In this regard, the hydraulic press 22 comprised a one hundred ton hydraulic press which was fitted with the hydraulic accumulator 22*a* to provide additional hydraulic pressure during the application of current. The press was also integrated with a fifty (50) KA battery power supply 30 and the controller 24 mentioned earlier herein.

The current from the power supply 30 was applied to the punches 26 and 28 such that it passed through the particulate material 14 which is compacted to an initial pressure by punches 26 and 28 under influence of the hydraulic press 22.

The current passing through the particulate material 14 during the consolidation process causes the particulate material 14 to be resistively heated causing it to become more compressible. The hydraulic accumulator 22*a* associated with hydraulic press 22 stores extra hydraulic fluid to allow follow up pressure to be applied to punches 26 and 28 to further consolidate or compress particulate material 14 therebetween.

The following tables I–III illustrate a few of the particulate materials that were consolidated by the method and a system of the present invention including pure iron (Fe); Fe-45P iron powder; and 410 SS powder. The tests were performed while hydraulic press 22 caused punches 26 and 28 to apply compaction pressures of 30, 40 and 50 tsi, while the power source 30 provided the current mentioned above for 0.5, 0.75 and one second for each sample. For stainless steel specimens, the times were lowered to less than 0.75 seconds in order to avoid excessive heating of punches 26 and 28. The densities were measured at each compaction pressure level and current application time. Associated base line data was acquired by measuring the density of each specimen at each compaction pressure where no current was applied during the compaction.

The following tables I–III summarize the results for each of the particulate materials tested:

TABLE I (Fe)

| Sample No. | Sample Mass (g) | Material | Load (tsi) | Pulse Time (s) | Bus Volt (mv) | Punch Voltage (volts) | Peak I (AMPS) | Actual Density (g/cc) | Theoretical Density (g/cc) |
|---|---|---|---|---|---|---|---|---|---|
| Baseline | 38.293 | Fe | 30 | 0 | | | | 6.82 | 7.86 g/cc |
| 1 | 37.404 | Fe | 30 | 0.5 | 160 | 7.03 | 26446 | 7.16 | 7.86 g/cc |
| 2 | 33.463 | Fe | 30 | 0.75 | 160 | 7.5 | 26446 | 7.25 | 7.86 g/cc |
| 3 | 33.66 | Fe | 30 | 1 | 160 | 7.67 | 26446 | 7.38 | 7.86 g/cc |
| Baseline | 37.854 | Fe | 40 | 0 | | | | 7.12 | 7.86 g/cc |
| 1 | 34.319 | Fe | 40 | 0.5 | 152 | 7.09 | 25124 | 7.38 | 7.86 g/cc |
| 2 | 34.222 | Fe | 40 | 0.75 | 152 | 7.19 | 25124 | 7.42 | 7.86 g/cc |
| 3 | 31.364 | Fe | 40 | 1 | 152 | 7.19 | 25124 | 7.63 | 7.86 g/cc |
| Baseline | 37.503 | Fe | 50 | 0 | | | | 7.33 | 7.86 g/cc |
| 1 | | Fe | 50 | 0.5 | 152 | 7.09 | 25124 | 7.55 | 7.86 g/cc |
| 2 | 34.336 | Fe | 50 | 0.75 | 152 | 7.09 | 25124 | 7.58 | 7.86 g/cc |
| 3 | 35.21 | Fe | 50 | 1 | 152 | 7.09 | 25124 | 7.61 | 7.86 g/cc |

TABLE II

Fe - 45P Powder

| | | |
|---|---|---|
| Material | Fe-45P | |
| Punch R | 1.80E − 04 | ohm |
| Cp | 450 | J/kg-C |

| Test No. | Sample Mass (g) | Material | Load (tsi) | Pulse Time (s) | Samp Temp (F.) | Bus Volt (mv) | Punch Voltage P1 (V) | Punch Voltage P2 (V) | Peak I (AMPS) | Energy (J) | dT (C) | Density |
|---|---|---|---|---|---|---|---|---|---|---|---|---|
| BASELINE | 41.363 | Fe-45P | 30 | 0 | | | | | | | | 6.71 |
| BAT838 | 40.075 | Fe-45P | 30 | 0.5 | 387 | 152 | 8.24 | 6.92 | 25124 | 30120 | 1670 | 7.13 |
| BAT839 | 38.455 | Fe-45P | 30 | 0.75 | 436 | 152 | 8.4 | 7 | 25124 | 46687 | 2698 | 7.3 |
| BAT840 | 38.906 | Fe-45P | 30 | 1 | 371 | 144 | 8.24 | 6.68 | 23802 | 57022 | 3257 | 7.36 |
| BASELINE | 40.005 | Fe-45P | 40 | 0 | | | | | | | | 7.02 |
| BAT841 | 40.074 | Fe-45P | 40 | 0.5 | 206 | 144 | 8 | 6.6 | 23802 | 27559 | 1528 | 7.37 |
| BAT842 | 37.945 | Fe-45P | 40 | 0.75 | NA | 144 | 8.04 | 6.48 | 23802 | 39196 | 2295 | 7.5 |
| BAT843 | 39.696 | Fe-45P | 40 | 1 | NA | 144 | 8 | 6.52 | 23802 | 53213 | 2979 | 7.52 |
| BASELINE | 39.859 | Fe-45P | 50 | 0 | | | | | | | | 7.22 |
| BAT844 | 40.762 | Fe-45P | 50 | 0.5 | 270 | 160 | 7.68 | 6.2 | 26446 | 19037 | 1038 | 7.47 |
| BAT845 | 40.148 | Fe-45P | 50 | 0.75 | 365 | 168 | 7.76 | 6.12 | 27769 | 23360 | 1293 | 7.59 |
| BAT846 | 40.189 | Fe-45P | 50 | 1 | 312 | 160 | 7.64 | 6 | 26446 | 32785 | 1813 | 7.59 |

TABLE III

410 SS Powder

| | |
|---|---|
| Material | 410 SS |
| Punch R | 1.80E − 04 |

| Test No. | Sample Mass (g) | Material | Load (tsi) | Pulse Time (s) | Samp Temp (F.) | Bus Volt (mv) | Peak I (AMPS) | Density (g/cc) |
|---|---|---|---|---|---|---|---|---|
| BASELINE | 36.402 | 410 SS | 30 | 0 | | | | 5.85 |
| BAT850 | 34.344 | 410 SS | 30 | 0.25 | 216 | 56 | 9256 | 5.93 |
| BAT851 | 35.374 | 410 SS | 30 | 0.5 | 412 | 48 | 7934 | 7.26 |
| BAT852 | 34.225 | 410 SS | 30 | 0.75 | 550 | 56 | 9256 | 7.47 |
| | | 410 SS | | 1 | 540 | 56 | 9256 | 7.59 |
| BASELINE | 34.941 | 410 SS | 40 | 0 | | | | 6.19 |
| BASELINE | 33.709 | 410 SS | 50 | 0 | | | | 6.49 |

Notice that densities near or in excess of ninety percent (90%) of the maximum theoretical density, which for iron Fe is 7.86 g/cc as defined in the CRC Handbook of Chemistry and Physics, 68th ed.; WEAST, R. C., ED; CRC Press: Boca Roton, Fla., 1987, were achieved while applying very low current levels for relatively long periods of time (i.e., where the current was applied for a timed T, where 0.1≦T≦1 second).

For example, the actual density for Sample No. 3 (Table I) having a sample mass of 33.66 grams, 30 tsi, for a pulse time of 1 second, bus volt of 160, punch voltage of 7.67 with a peak amps of 26446 had an actual density of 7.38 g/cc. Comparing this to the theoretical density of 7.76 g/cc for Fe, it can be seen that the density is 97.58% (7.67÷7.86) which is in excess of 90%.

It should be appreciated that other current levels and durations may be used. For example, other, lower currents may be applied for longer duration, for example, depending on the material being consolidated.

Figure 3:
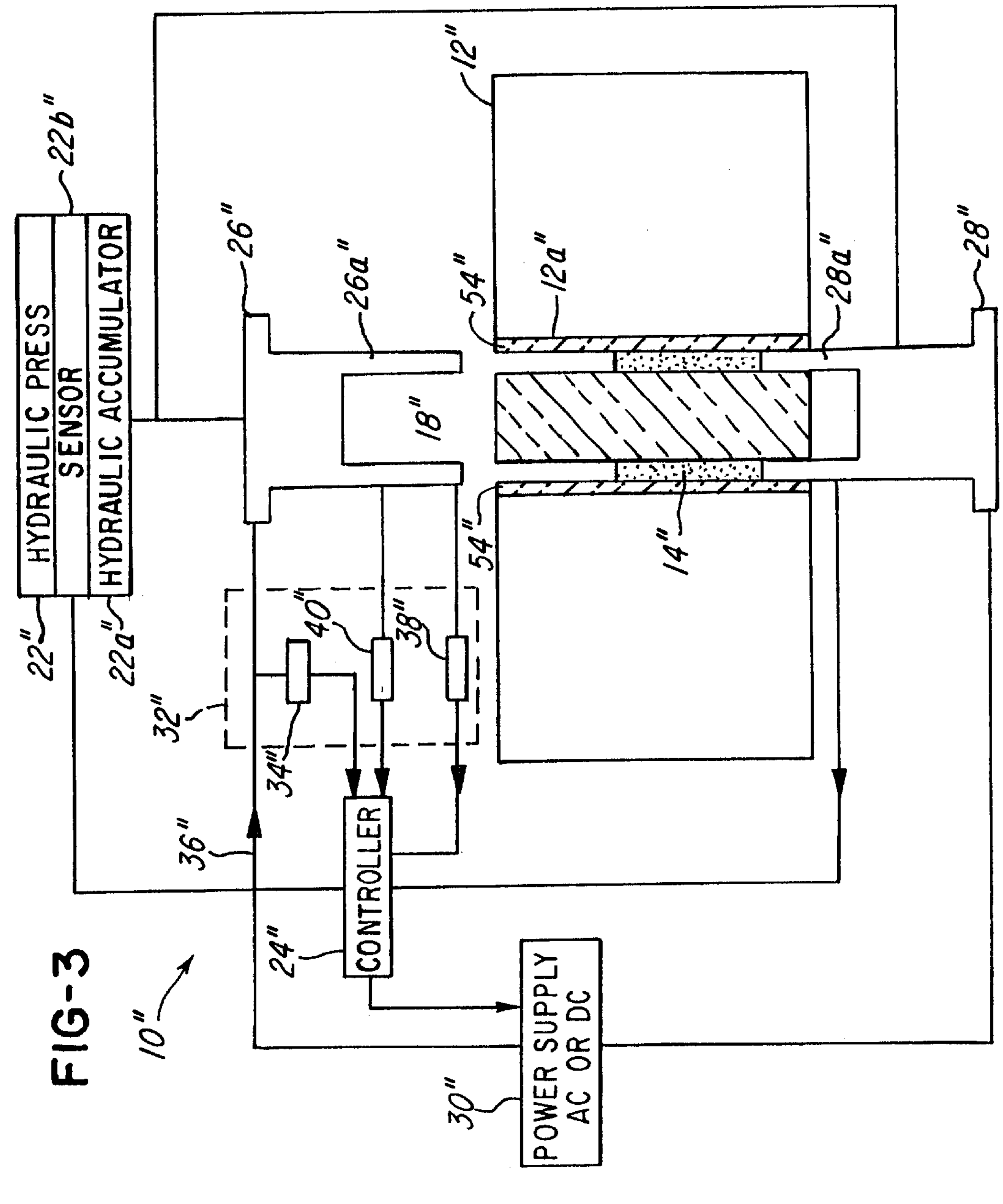
FIG. 3 is a sectional-schematic illustration of another embodiment of the invention showing a die liner coating used to line a die used in the consolidation process.

Referring now to FIG. 3, another embodiment of the invention is illustrated. In this embodiment parts which have similar or some functions as parts in FIG. 1 have been identified with the same numerals as shown, except that a double prime label """ has been added thereto. In this embodiment, notice the steel die container 12" comprises an insulative coating 54" which becomes integrally formed onto an interior surface or wall 12*a*" of die 12". In the embodiment being described, the insulative coating 54" comprises a natural oxide and may be applied such that it comprises a thickness of about $6\times10^{-6}$ meter to $100\times10^{6}$ meter.

Advantageously, the insulative coating 54" facilitates eliminating the ceramic liner 16 (FIGS. 1 and 5). The coating 54" also facilitates increasing the useful life of die 12, as well as the manufacture of intricate parts which are difficult to consolidate using thick ceramic liners. Moreover, this system and method are simple and typically require tooling which is less expensive than approaches of the past.

The coating 54" may be applied by, for example, steam heat treatment or other oxide and phosphate coating techniques. For example, the coating 54" may comprise an oxide or a diamond film.

Figure 4:
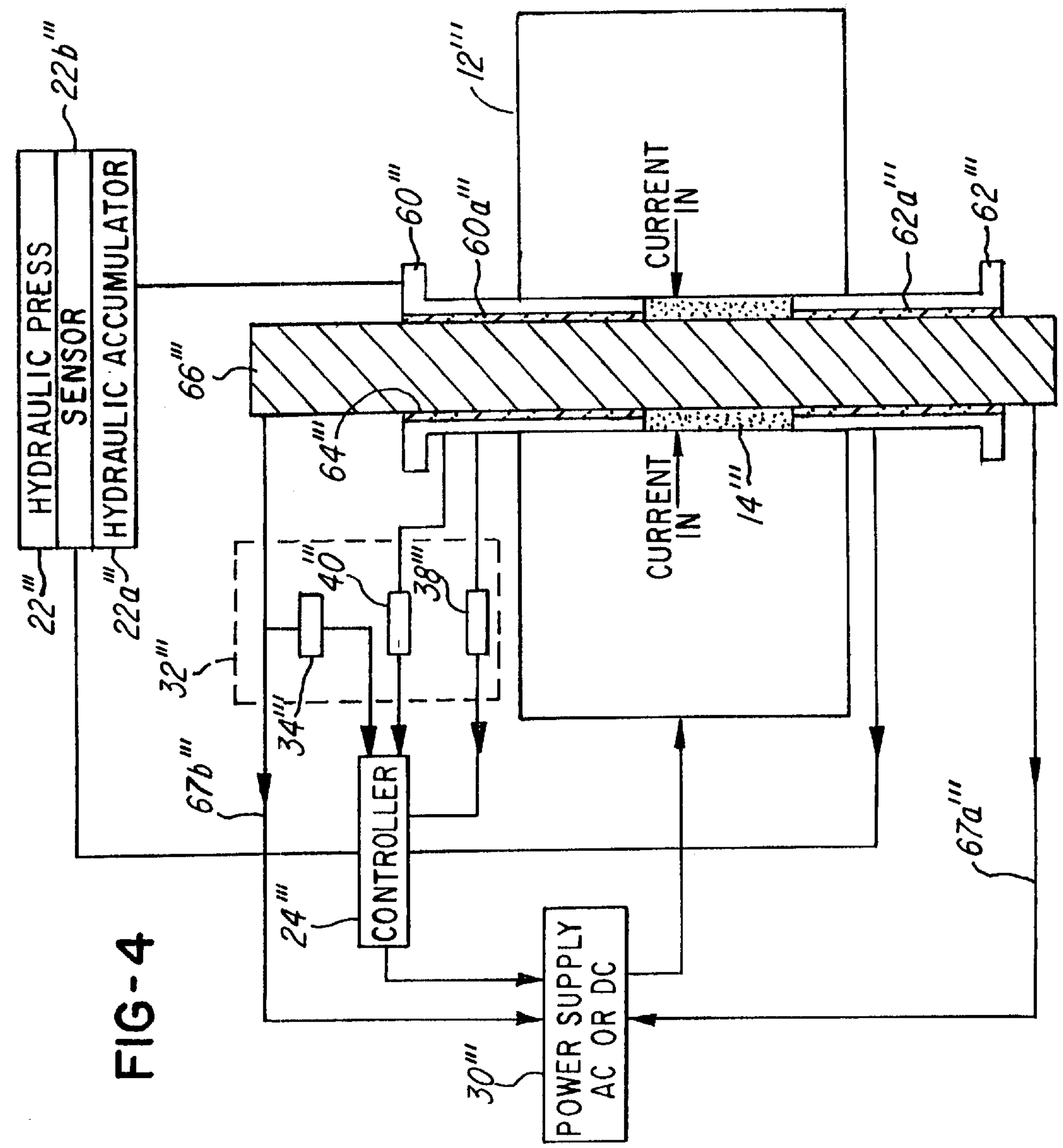
FIG. 4 is a sectional-schematic view illustrating another embodiment of the invention.

FIG. 4 illustrates still another embodiment of the invention showing another arrangement of the invention. Parts which have the same or similar function as the parts in FIG. 1 are identified with the same part numbers with, except that a triple prime label (""") has been added thereto.

In this embodiment, power supply 30''' applies current through die 12'''. Note that this embodiment comprises a pair of punches 60''' and 62''' which define an aperture 64''' in which a conductive rod 66''' is situated. It should be appreciated that the punches 60''' and 62''' comprise an insulative lining 60*a*''' and 62*a*''' which insulates the conductive rod 66''' from the punches 60''' and 62''', respectively. In a manner similar to the embodiment shown in FIGS. 1 and 3, power supply 30''' applies the current through die 12''' which passes through the material 14''' to rod 66''' where it returns along lines 67*a*''' and 67*b*''', as shown in FIG. 4. Similar to the embodiment shown in FIG. 1, the feedback control 32''' comprises a plurality of sensors 34''', 38''' and 40''' which are coupled as shown and which provide the feedback information mentioned earlier herein.

Advantageously, this embodiment facilitates providing a system and method for consolidating particulate materials 14''' using a radial current flow particularly in situations or configurations which require the use of sizable core rods. Such configurations may be encountered when making parts with central holes.

Advantageously, these embodiments illustrate means and apparatus for consolidating particulate material to achieve densities in excess of ninety-five percent (95%) or even ninety-eight percent (98%) of the theoretical density of the material being consolidated. In the embodiments being described and illustrated in Tables I–III, the inventors have been able to achieve densities in excess of ninety-five percent (95%) of theoretical densities by using electrical discharges of relatively long duration, but relatively low current densities.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A particulate materials consolidation system comprising:

a particulate material die for receiving a particulate material to be consolidated;

a first punch and a second punch which cooperate with said particulate material die to compress the particulate material;

a power source coupled to said first and second punches to energize said particulate material to a predetermined energy level for a duration of at least 0.1 second at a current of less than about 10 $KA/cm^2$ when said particulate material is being consolidated; and a feedback control coupled to said punches and said power source for monitoring a characteristic of said particulate material when it is being consolidated and generating a feedback signal in response thereto; said power source adjusting said predetermined energy level in response to said feedback signal while said particulate material is being consolidated such that said particulate material achieves at least 95 percent of its maximum theoretical density.

2. The particulate material consolidation system as recited in claim 1 wherein said power source comprises a power supply which energizes said particulate material for a duration of less than 1 second.

3. The particulate material consolidation system as recited in claim 2 wherein said first and second punches comprise a punch resistivity of less than about $25\times10^{-8}$ ohm-meter.

4. The particulate material consolidation system as recited in claim e wherein said first and second punches comprise a punch resistivity of less than about $25\times10^{-8}$ ohm-meter.

5. The particulate material consolidation system as recited in claim 1 wherein said particulate material die comprises a die surface having an insulator thereon.

6. The particulate material consolidation system as recited in claim 5 wherein said insulator is ceramic.

7. The particulate material consolidation system as recited in claim 5 wherein said insulator is a coating integral with said die surface.

8. The particulate material consolidation system as recited in claim 5 wherein said insulator is a coating comprises a thickness of less than about $6\times10^{-6}$ meter to $100\times10^{-6}$ meter.

9. The particulate material consolidation system as recited in claim 7 wherein said coating comprises an oxide or a diamond film.

10. The particulate material consolidation system as recited in claim 1 wherein said power source comprises a DC power source.

11. The particulate material consolidation system as recited in claim 1 wherein said power source comprises an AC power supply.

12. The particulate material consolidation system as recited in claim 1 wherein said feedback control comprises a voltage sensor coupled to said first and second punches for measuring a voltage across said particulate material and for generating a voltage signal which defines said feedback signal.

* * * * *